(12) United States Patent
Mayers

(10) Patent No.: US 9,729,321 B2
(45) Date of Patent: Aug. 8, 2017

(54) AUTONOMOUS PRIVATE KEY RECOVERY

(71) Applicant: Citrix Systems, Inc., Fort Lauderdale, FL (US)

(72) Inventor: Christopher Morgan Mayers, Histon (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 37 days.

(21) Appl. No.: 14/699,712

(22) Filed: Apr. 29, 2015

(65) Prior Publication Data
US 2016/0323104 A1    Nov. 3, 2016

(51) Int. Cl.
*H04L 29/06*      (2006.01)
*H04L 9/08*       (2006.01)

(52) U.S. Cl.
CPC ........ *H04L 9/0894* (2013.01); *H04L 63/0407* (2013.01); *H04L 63/0807* (2013.01); *H04L 63/0823* (2013.01)

(58) Field of Classification Search
CPC ....................................................... H04L 29/06
See application file for complete search history.

(56) References Cited

U.S. PATENT DOCUMENTS

| | | | |
|---|---|---|---|
| 6,263,446 B1 * | 7/2001 | Kausik ................ | G06F 21/6245 380/259 |
| 8,819,797 B2 * | 8/2014 | Cross ...................... | G06F 21/33 726/1 |
| 2005/0257072 A1 * | 11/2005 | Cross ...................... | H04L 63/06 713/193 |
| 2007/0107048 A1 * | 5/2007 | Halls ........................ | G06F 21/33 726/4 |
| 2010/0306547 A1 | 12/2010 | Fallows et al. | |
| 2014/0173705 A1 | 6/2014 | Manning | |

FOREIGN PATENT DOCUMENTS

EP         1585286 A2      10/2005

OTHER PUBLICATIONS

PCT Patent Application US2015/030224 filed May 11, 2015; International Search Report and Written Opinion dated Nov. 18, 2015.

* cited by examiner

*Primary Examiner* — William Powers
(74) *Attorney, Agent, or Firm* — Finnegan, Henderson, Farabow, Garrett & Dunner LLP

(57) ABSTRACT

Approaches described herein allow a stateless device to recover at least one private key. In particular, a stateless device can provide service-account credentials to a directory service to establish a first session and acquire a certificate and private key using information associated with the stateless device. The stateless device can store its private key before the first session ends. A stateless device can then provide user-account credentials to the directory service to establish a second session. After the second session begins, a private key can be acquired by the stateless device.

20 Claims, 7 Drawing Sheets

AUTONOMOUS PRIVATE KEY RECOVERY

BACKGROUND

Stateless computing generally refers to computing devices (or stateless devices) that do not store any unique software configuration or state within them. Any configuration necessary comes from an outside device, which is used for its computational resources. Stateless computing has become increasingly popular over the last few decades. This is partially because personal computers (PCs) have local storage, which can become corrupted, infected with viruses, or hijacked by hackers. Moreover, stateless devices are increasingly being used due to their reduced downtime, ease of maintenance, and better network security.

A virtual machine is typically a stateless emulation of a particular computer system. Although stateless virtual machines can store data, stored data is not persisted when a stateless virtual machine session ends. Virtual machines are created and executed by a hypervisor running on a physical machine (or host machine), which is used for its resources. Each virtual machine running on the host machine is generally referred to as a guest machine, which can have a corresponding operating system (or guest operating system).

Virtual machines can also access directory services (e.g., Microsoft's Active Directory). A directory service is a software system that stores, organizes, and provides access to information in a computer operating system's directory. Active Directory, developed by Microsoft for Windows computers, provides a directory services system and is included as part of Windows Server OS as set processes and services. For example, Active Directory provides customizable services for issuing and managing certificates in software security systems that use a public key infrastructure (PKI). Active Directory can create one or more certificate authorities that can receive requests for certificates (such as digital certificates), verify information in the requests, issue certificates, and revoke certificates.

Stateless virtual machines, however, are unable to store certificates (and associated keys) since they do not have persistent memory. This presents problems, such as network delay when a large number of virtual machines boot and request new certificates and private keys. Further, detecting unauthorized certificate requests becomes more difficult when many virtual machines require new keys every time they are rebooted.

BRIEF DESCRIPTION OF THE DRAWINGS

Reference will now be made to the accompanying drawings showing example embodiments of this disclosure. In the drawings.

DETAILED DESCRIPTION

Figure 1:
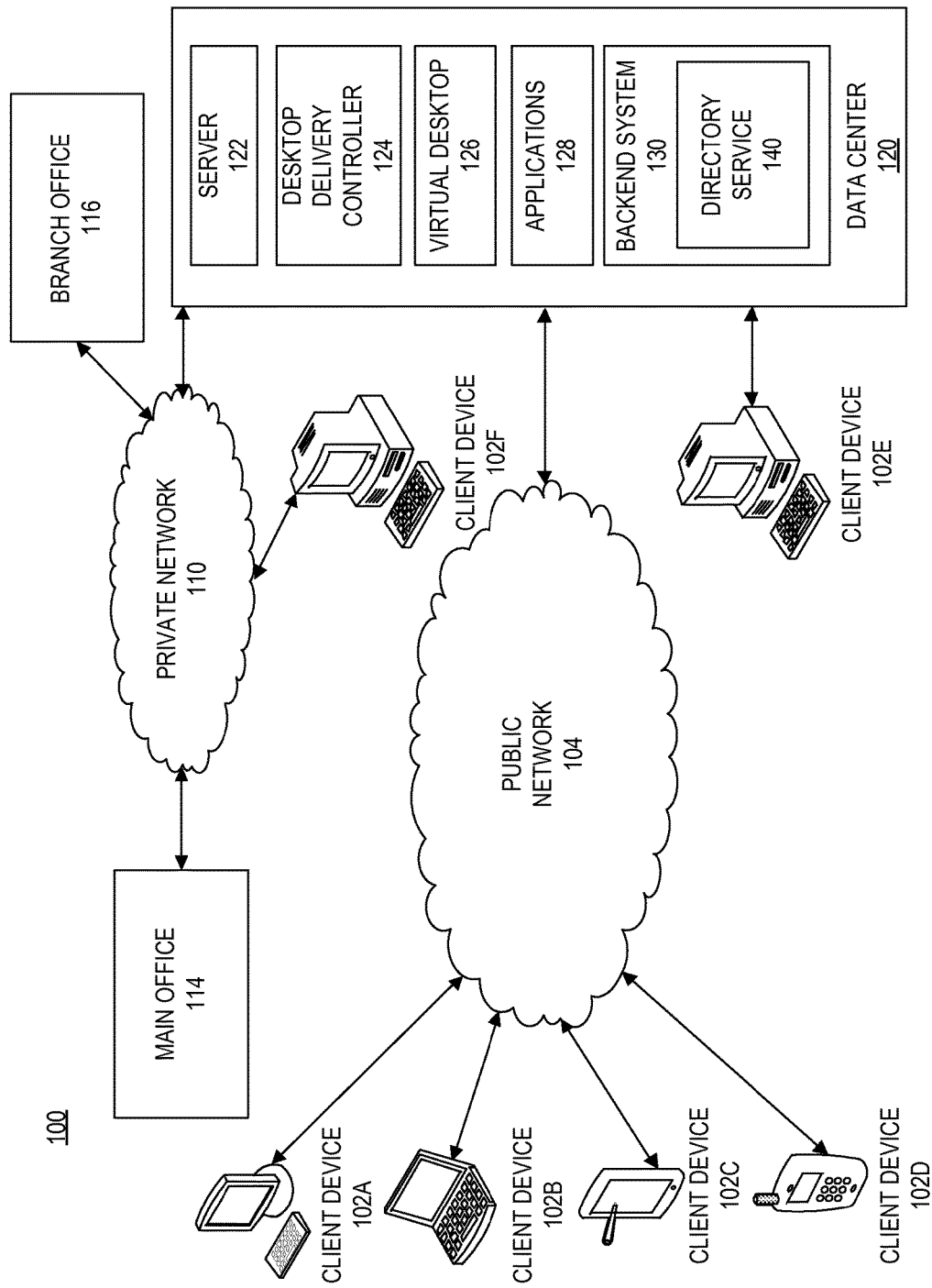
FIG. 1 is a block diagram of an exemplary network environment, consistent with embodiments of the present disclosure.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

A directory service, such as Active Directory, provides services that store a certificate and its associated keys. One such service is credential roaming. Credential roaming allows users to use more than one computer and be able to use the same certificates and private keys regardless of which computer they use. If a user logs on to a domain with a user account using a device without a certificate and private key, credential roaming can store and/or retrieve a certificate and private key for the device.

Only certain types of domain accounts can use credential roaming. For example, while credential roaming can be used by user accounts and some managed service accounts, credential roaming cannot be used by network service accounts.

Certificate-using services (e.g., Microsoft™ Windows™ services such as Internet Information Services) are designed to operate with specific privileges, and are configured to log on to a domain (or a directory service) using a corresponding account (e.g., a managed service account). The type of account that a service logs in with affects where certificates are stored, and whether credential roaming is available.

Typically when a managed service account enrolls for a certificate, a certificate is issued with the name of the device that the managed service account used to log on. When a user account enrolls for a certificate, however, the certificate is issued with the name of the user. Thus, a user account is typically not useful for the enrollment of a service, because the certificate will have the wrong name (e.g., not the name of the device). This is one reason why services can use a network service account to log on, such that the service has access to the device's certificate, which has the correct name (e.g., the name of the device). Services that use a network service account to log on, however, cannot use credential roaming.

Embodiments described herein allow a stateless device to log on to a domain using an account (e.g., a managed service account), such that the issued certificate contains the name of a stateless device. After enrollment has occurred and a certificate and private key are received, the certificate and private key can be saved in a location (e.g., within Active Directory, within a certificate store, etc.). If a certificate and private key are saved in a directory service such as Active Directory, they can be retrieved using credential roaming at a later period in time, such as when a stateless device logs on to the domain with a user-account. Thus, credential roaming can be used by a stateless device to retrieve a certificate with the name of the stateless device, even though a user-account was used by the stateless device to log on to a domain.

When a stateless device (e.g., a virtual machine) boots, an autoenrollment mechanism can determine whether the stateless device has a certificate and private key. If the autoenrollment mechanism, or the stateless device operating the autoenrollment mechanism, determines that the stateless device does not have a certificate and private key, the stateless device (or the autoenrollment mechanism) will request a certificate and private key (e.g., from a directory service such as Active Directory).

Stateless devices ordinarily employ some type of autoenrollment mechanism because they typically do not have a persistent memory for storing a certificate and private key. In embodiments described herein, credential roaming can store one or more certificates and/or private keys. In addition, credential roaming can provide one or more certificates and/or private keys to a stateless device before a boot process ends, such that the autoenrollment mechanism does not cause a new certificate and private key to issue for the stateless device. The autoenrollment mechanism's triggers can be configured by a user or another device. Such configuration can cause credential roaming to be performed prior to the triggering of the autoenrollment mechanism. By executing credential roaming prior to executing the autoenrollment mechanism, a stateless device can reuse a certificate with the name of the device, such that it can use the same certificate and private key for each session.

In various embodiments, a certificate distributor can use a credential roaming mechanism to synchronize certificates and private keys with directory services that hold certificates on behalf of a certificate-using service. If a certificate distributor is configured to use a group managed service account, it can replicate a certificate and private key on multiple servers.

FIG. 1 is a block diagram of an exemplary network environment 100. While exemplary network environment 100 is directed to a virtual network environment, it is appreciated that the network environment 100 can be any type of network that communicates using packets. Network environment 100 can include one or more client devices 102A-F, a public network 104, a private network 110, a main office 114, a branch office 116, and a data center 120.

One or more client devices 102A-F (collectively 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiments, a main office 114 and a branch office 116 can also include one or more client devices (e.g., wearable devices) that are similar to client devices 102A-F. Main office 114 can be located, for example, in a principal place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device that communicates packets to and from data center 120.

Public network 104 and private network 110 can be any type of network such as a wide area network (WAN), a local area network (LAN), or a metropolitan area network (MAN). In one example, a WAN can be connected to and/or replaced with the Internet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122), a desktop delivery controller 124, a virtual desktop 126, applications 128, a backend system 130, and a directory service 140 (e.g., Microsoft's Active Directory).

Server 122 can be an entity represented by an IP address and can exist as a single entity or a member of a server farm. Server 122 can be a physical server or a virtual server. In some embodiments, server 122 can include a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™- or SAP™-based applications and computing resources. Via the communication subsystem, server 122 can communicate with other devices (e.g., client devices 102) through various types of networks (e.g., private network 110 and public network 104).

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 128), or a combination thereof.

Backend system 130 can be a single or multiple instances of computer networking hardware, appliances, or servers in a server farm or a bank of servers. Backend system 130 can interface directly or indirectly with server 122. For example, backend system 130 can include directory service 140, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP) server. Backend system 130 can provide data, services, or a combination of both to data center 120, which can then provide that information via varying forms to client devices 102 or branch office 116.

Figure 2:
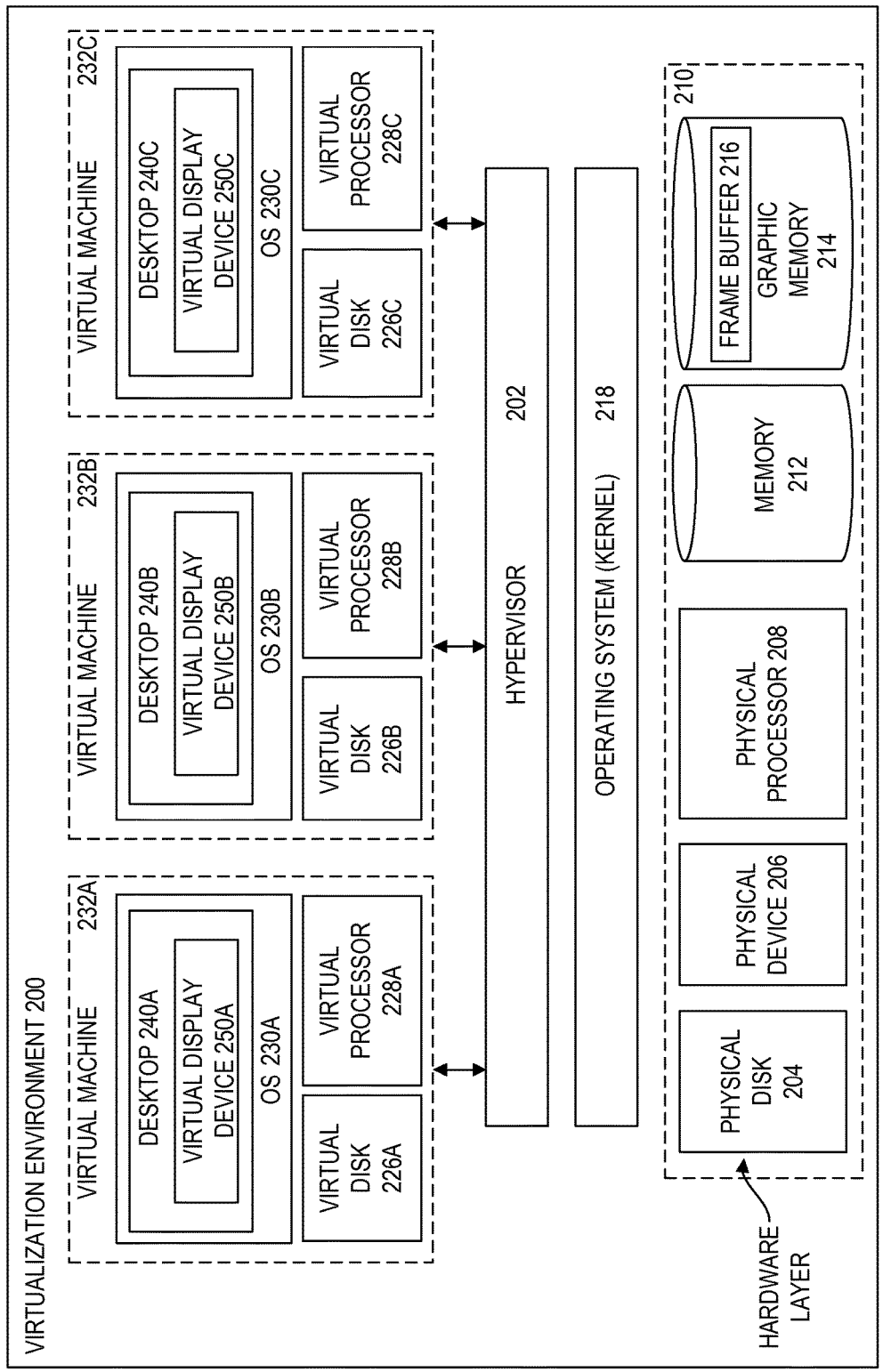
FIG. 2 is a block diagram of an exemplary virtualization environment, consistent with embodiments of the present disclosure.

FIG. 2 is a block diagram of an exemplary virtualization environment 200. In some embodiments, virtualization environment 200 can include a computing device (e.g., client device 102 or server 122). In some embodiments, the modules, programs, virtual machines, and commands stored and executed by virtualization environment 200 can be executed by more than one computing device. For example, virtualization environment 200 can include a server farm.

Virtualization environment 200 can include a hardware layer 210 that can include one or more physical disks 204, one or more physical devices 206, one or more physical processors 208, a system memory 212, and a graphic memory 214. In some embodiments, frame buffer 216 can be stored within a memory element in graphic memory 214 and can be executed by one or more of physical processors 208.

Physical disk 204 can be either an internal or an external hard disk. Virtualization environment 200, in some embodiments, can communicate with an external hard disk that is included in the hardware layer 210 as physical disk 204. Physical devices 206, in some embodiments, can be any combination of devices included in virtualization environment 200 and external devices that communicate with virtualization environment 200. Physical device 206 can be any device such as a network interface card, a video card, a keyboard, a mouse, an input device, a monitor, a display device, speakers, an optical drive, a storage device, a universal serial bus connection, any device connected to virtualization environment 200, any device communicating with virtualization environment 200, a printer, a scanner, or any other device that is desired. In some embodiments, physical processors 208 can be any processor and can include, for example, CPUs and GPUs.

System memory 212 can include any type of memory that can store data, programs, firmware, or set of executable instructions. Programs, firmware, or executable instructions stored in system memory 212 can be executed by one or more physical processors 208 of virtualization environment 200. System memory 212 can be persistent. Thus, although virtual machines may not be able to store anything in their virtual disks 226A, 226B, 226C (collectively 226) when they reboot, virtual machines can store data in system memory 212 that they can retrieve after rebooting. For instance, system memory 212 can store data including, but not limited to: account credentials, passwords, password hashes, system-account password hashes, user-account password hashes, certificates, private keys, etc. In some embodiments, system memory 212 stores an account password for a certificate distributor 330 (of FIG. 3) to log onto a domain with. In such a case, the password store 380 (of FIG. 3) can be located in system memory 212. As described below, virtual machine 232 can retrieve a password out of system memory 212 to log on to a domain.

Graphic memory 214 can be any memory space accessible by physical processors 208, including local memory, system memory, on-chip memories, and hard disk. Physical processors 208 can display certain graphics corresponding to graphical data stored in graphic memory 214 on a display device of physical devices 206.

Virtualization environment 200 can further include operating system 218 that can be stored in a memory element in system memory 212 and executed by one or more of physical processors 208. Operating system 218 can also be referred to as kernel. Moreover, virtualization environment 200 can include hypervisor 202. Hypervisor 202 can be a program executed by physical processors 208 in virtualization environment 200 to manage any number of virtual machines. Hypervisor 202 can be referred to as a virtual machine monitor, or platform virtualization software. In some embodiments, hypervisor 202 can be any combination of executable instructions and hardware that monitors virtual machines executing on a computing device. Hypervisor 202 can be stored in a memory element in system memory 212.

Hypervisor 202, in some embodiments, can provide access to resources to one or more virtual machines, e.g., virtual resources such as virtual machines 232A-C. A virtual machine can be a fully-virtualized virtual machine. A fully-virtualized virtual machine can have a guest operating system to allow executing of its software. While running on a host computer, a fully-virtualized virtual machine is unaware that it is a virtual machine. A fully-virtualized virtual machine is sometimes also referred as a Domain U or domU virtual machine (e.g., virtual machine 232A). A domU virtual machine can be controlled by a control program of another virtual machine. The control program can also be referred to as a control operating system, a control domain, a Domain 0, or dom0. Thus, the virtual machine that runs the control operating system can be referred to as a dom0 virtual machine (e.g., virtual machines 232B-C). In some embodiments, a dom0 virtual machine can have direct access to host computer's hardware resources and thus the control program can be executed by the host computer's operating system. A dom0 virtual machine can have access to the host computer's hardware resources through a hypervisor that either runs directly on the host computer's hardware (i.e., a bare metal hypervisor) or runs within the host computer's operating system (i.e., a hosted hypervisor). In some embodiments, a virtual machine can also be a service domain virtual machine, also referred as a Domain S or domS virtual machine (not shown).

Hypervisor 202, in some embodiments, can provide virtual resources to guest operating systems (domU) 230A-B and/or a control operating system (dom0) in any manner such that hypervisor 202 simulates any desirable operating systems (e.g., Windows™, Linux, Unix) to execute on virtual machines 232A-C. The system resources can include, for example, hardware layer 210 and any other component included in virtualization environment 200. In these embodiments, hypervisor 202 can be used to emulate virtual hardware, partition physical hardware, virtualize physical hardware, or execute virtual machines that provide access to computing environments. In some embodiments, hypervisor 202 can control processor scheduling and memory partitioning for virtual machine 232A-C executing in virtualization environment 200.

In some embodiments, hypervisor 202 can create virtual machines 232A-C, in which guest operating systems 230A-C or a control operating system execute, respectively. As an example, hypervisor 202 can load a virtual machine image to create a virtual machine 232. As another example, hypervisor 202 can execute guest operating systems 230A, 230B, and 230C within virtual machines 232A, 232B, and 232C, respectively.

Figure 3:
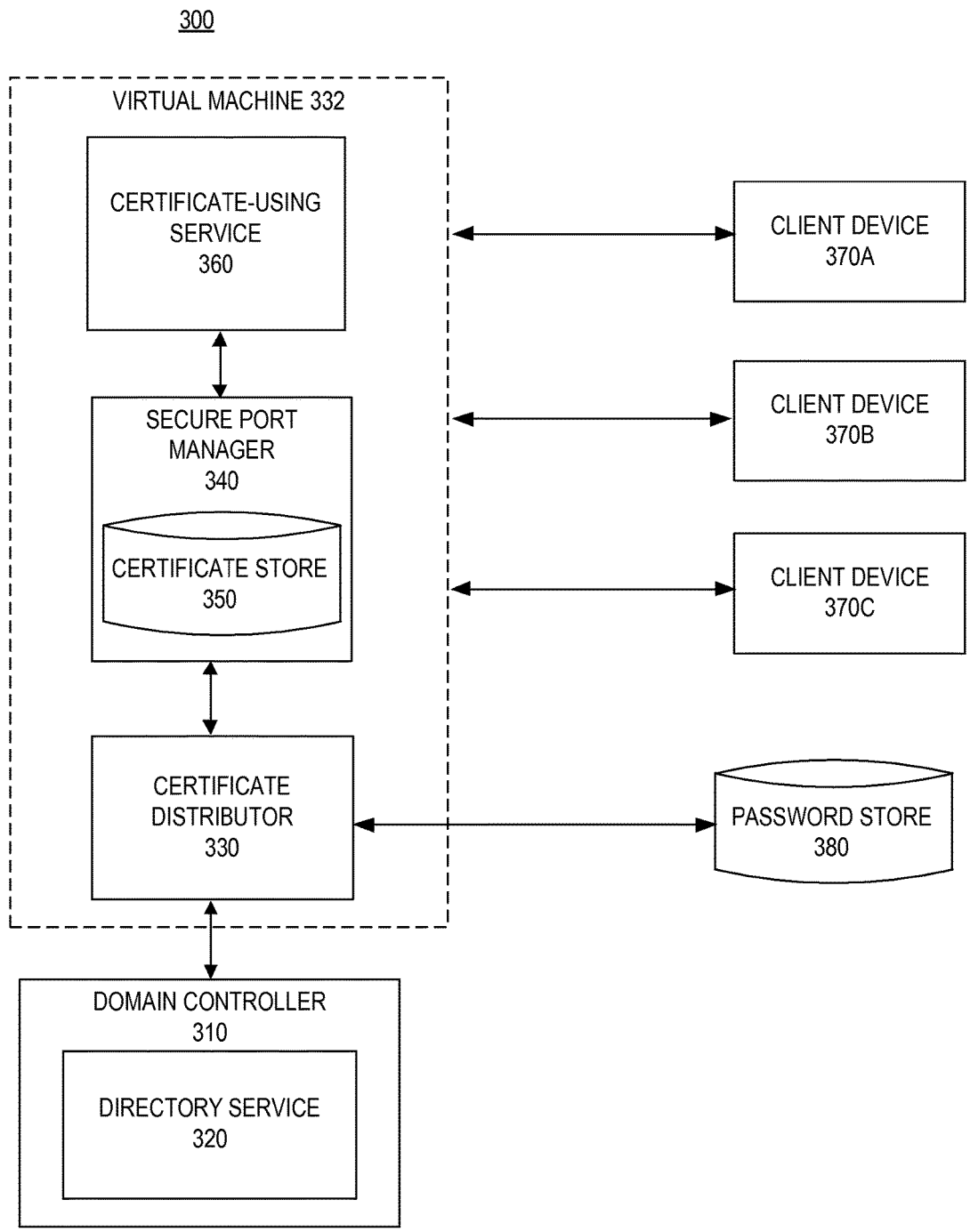
FIG. 3 is a block diagram of an exemplary environment including a domain controller, consistent with embodiments of the present disclosure.

FIG. 3 illustrates a block diagram of exemplary environment 300 implementing a domain controller 310, consistent with embodiments of the present disclosure. Domain controller 310 implements a directory service 320, such as Active Directory. In various embodiments described herein, domain controller 310 is an unmodified Windows™ domain controller 310.

Client devices 370A, 370B, 370C (collectively 370) can communicate with a virtual machine 332 and/or a certificate-using service 360, such as Microsoft™ Remote Desktop Services, Microsoft™ Internet Information Services, etc. It should be appreciated that virtual machine 332 can be any type of stateless device. In various embodiments certificate-using service 360 is included in virtual machine 332. Certificate-using service 360 can be an unmodified Windows™ service. Secure port manager 340 can allow client devices 370 to communicate with one or more certificate-using services 360. It should be appreciated that although certificate-using service 360, secure port manager 340, and certificate distributor 330 are included in virtual machine 332, one or more of these devices can be remote from virtual machine 332. Further, it should be appreciated that virtual machine 332 can be any type of stateless device, not only a virtual machine.

In various embodiments, a secure port manager 340 is a privileged Windows™ service, and can perform tasks including detecting that certificates and private keys are missing, unusable, or about to become unusable (e.g., a secure port manager 340 can determine that a certificate belonging to certificate-using service 360 is going to expire within a particular period of time). Secure port manager 340 can send existing certificates and private keys to certificate distributor 330, and acquire certificates and private keys (e.g., for updates, or when missing) from certificate distributor 330. In addition, secure port manager 340 can configure certificate-using service 360 to use a particular (e.g., valid) certificate and a private key.

In various embodiments, secure port manager 340 matches the behavior of corresponding certificate-using service 360, since a configuration of certificate-using service 360 can be specific to a particular service (e.g., applications can run as a Local Service account, a Network Service account, a Local System account, a Managed Service account, or a Virtual account). One secure port manager 340 can correspond to one certificate-using service 360. For example, each certificate-using service 360 (e.g., Remote Desktop Services, Internet Information Services, etc.) can have a corresponding secure port manager 340 that allows client devices 370 to communicate with certificate-using service 360. In some embodiments, a single certificate-using service 360 can exist that corresponds with a single secure port manager 340. Although, in some embodiments, one or more certificate-using services 360 can correspond with one or more secure port managers 340.

In various embodiments, certificate distributor 330 can log on to a domain and use credential roaming. Certificate distributor 330 can synchronize certificates and private keys with directory service 320. Certificate distributor 330 can also send missing certificates and private keys to secure port manager 340 to allow certificate-using service 360 to maintain valid certificates. By synchronizing with directory service 320, certificate distributor 330 can ensure that the private keys that certificate distributor 330 holds on behalf of certificate-using service 360 are valid.

In some embodiments, secure port manager 340 comprises a certificate store 350. In addition to secure port manager 340 being able to access certificate store 350, certificate distributor 330 can have access to certificate store 350. In such a case, secure port manager 340 can grant access to certificate distributor 330, which can occur when the secure port manager 340 and/or certificate distributor 330 are installed. Secure port manager 340 can signal to certificate distributor 330 when a change is needed (e.g., when a certificate or private key is missing or invalid), and certificate distributor 330 can update certificate store 350. It is appreciated that certificate distributor 330 can comprise a certificate store also. In such an example, secure port manager 340 can access a certificate store of certificate distributor 330 to access certificates (e.g., if a certificate needs updated, etc.) It is also contemplated that in some embodiments, certificate store 350 can be separate from secure port manager 340, certificate distributor 330, and/or virtual machine 332. For example, certificate store 350 could be stored on a remote machine, or in system memory 212. In such a case either secure port manager 340 or certificate distributor 330 can access certificate store 350. In any case, regardless of the configuration, certificates can either be pushed or pulled from one device to another.

Although a device can be stateless, in some embodiments, certificate distributor 330 can store a password (or the equivalent of a password, such as a password hash) in a persistent system memory 212 to log on with a user account. It should be appreciated that in some embodiments, certificate distributor 330 and system memory 212 could be the same component or that system memory 212 can include certificate distributor 330. Regardless, the persistent memory allows embodiments described herein to recover private keys and certificates autonomously (e.g., without user intervention). Account passwords (e.g., managed service-account passwords and/or user-account passwords) can be stored in password store 380, which provides persistent store capabilities.

When certificate distributor 330 is booted, password store 380/memory 212 can provide a user-account password to certificate distributor 330 prior to the triggering of an autoenrollment mechanism. Password store 380 can be virtual or physical, and be included in a data center/back-end device or be external to a back-end device. In some examples, password store 380 and system memory 212 could be the same component or that system memory 212 includes password store 380 (or at least be included in the same machine as memory 212). Password store 380 can also restore a certificate distributor service password from persistent storage on reboot, before a certificate distributor service is started (e.g., before an autoenrollment mechanism begins).

Managing certificates individually can unnecessarily use resources. Thus, organizations often manage certificates using automated group policy settings applied to client computers in a domain, group, or organization. In some embodiments, certificate distributor 330 is configured to use Group Managed Service Accounts. Certificate distributor 330 can be configured to replicate certificates and private keys, such that the same certificates and private keys can exist on multiple servers, without additional modification. Further, additional cryptography may not be necessary to protect private keys when using certificate distributor 330 since credential roaming automatically provides cryptographic support.

With credential roaming, certificates and private keys that certificate distributor 330 holds do not have to be obtained from a particular certificate authority. In various embodiments, a certificate authority does not store a copy of a computer's private key. In some embodiments, Microsoft's certificate authorities could be used to acquire certificates. Also, a certificate authority provided by another system, such as UNIX, could be used to acquire certificates. In addition, multiple certificates can be used if certificate-using service 360 requires so. For example, certificate-using service 360 can require multiple keys during a rollover (e.g., when a certificate is about to expire and needs to be replaced). In such a case, a new certificate can be obtained in advance of the rollover, such that more than one certificate is present at certificate-using service 360.

In various embodiments, a single certificate distributor 330 can support more than one secure port manager 340. For example, when multiple certificate-using services 360 are on a single machine. In some instances, if a system does have persistent storage suitable for certificates and private keys, certificate distributor 330 can use the persistent storage rather than credential roaming. Further, in various embodiments, it could be possible for each secure port manager 340 to access persistent storage directly. In some implementations of a certificate store interface, certificate distributor 330 can behave as a shadow. In such a case, secure port manager 340 may not need to monitor a certificate store or signal a certificate distributor 330. Such an approach could be achieved by using a collection store. Further, in an embodiment, an implementation of the Microsoft™ Cryptographic Service Provider interface or Key Storage Provider interface could be implemented, in which a certificate distributor 330 behaves as a shadow. In some embodiments, it is contemplated that group protected PKCS#12 files could be used as an import/export mechanism, instead of credential roaming.

In various embodiments, it is contemplated that rather than using a certificate distributor 330 to access a secure port manager's 340 certificate store, secure port manager 340 could access a certificate distributor's 330 certificate store. If there is more than one secure port manager 340 on a computer, such an approach could require that all secure port managers 340 trust each other. Further, in such embodiments, a certificate distributor can remain logged on such that credential roaming continues to operate correctly.

In some embodiments, certificate distributor 330 can be located in a separate, specialized virtual machine on the same host as a guest virtual machine it would have been located on. Such an approach could have the advantage of confining copies of private keys held by a certificate distributor 330 on behalf of certificate-using services 360 outside of a guest virtual machine. If a specialized virtual machine had access to privileged hypervisor mechanisms, such as a physical trusted platform module or a hardware security module, private keys would be further protected. This would also allow for the support of stateless non-Windows™ virtual machines (which could not use credential roaming).

In various embodiments, key escrow is used to recover private decryption keys, rather than signing keys. Key escrow can involve administrative intervention to authorize key discovery, and also allows someone other than an original requestor to recover a key.

In various embodiments, hardware security modules support networked key distribution, such that private keys are be managed at a central hardware security module, and distributed via a network to satellite hardware security modules that use private keys to perform signing. Such an approach relies on proprietary key distribution protocols, however, and the hardware security of each hardware security module.

In various embodiments, replication can occur where two or more replicas can be configured with an identical configuration, including the same private key. This can be achieved using a proprietary replication protocol, if there is a secure communication path between the replicas, or by a manual export/import of a configuration.

In various embodiments, bulk encryption products such as disk encryption products use a symmetric bulk encryption key for authentication of a device. Such a key is encrypted via a key hierarchy with several alternative keys that support different key protector authentication mechanisms such as trusted platform modules. Bulk encryption products can allow an underlying bulk encryption key to be recovered, even after authentication credentials are changed, or if rekeying is needed. Such embodiments typically implement key hierarchies (e.g., chains).

In various embodiments, session key interceptors can be used and can allow authorized parties to recover a session key used by a particular encrypted communication. This can be used by regulated organizations performing lawful interception, either online or offline (e.g., to decrypt a recorded session).

Some extensions of embodiments discussed herein include strengthening secure port manager 340 and certificate distributor 330 against tampering by making them Windows™ protected services. Authorization controls can be enforced on release of private keys from a certificate distributor 330 based at least in part on contextual information, such as the time of day, an Internet Protocol address, or an identity of a host system for a virtualized computer (or using additional mechanisms such as a one-time use code or a lease). In some embodiments, certificate distributor 330 can be used only for certificates (if private keys are confined to hardware, or to virtualized hardware such as a virtual trusted platform module). Further, audit logs could be added to indicate whether a private key was acquired by a stateless device, or Microsoft™ certificate store functions (such as CertControlStore) could be used to detect certificate store changes and inconsistencies. In some embodiments, an enroll-on-behalf-of option could be provided for requesting certificates, with appropriate name constraints (e.g., if no credentials).

Figure 4:
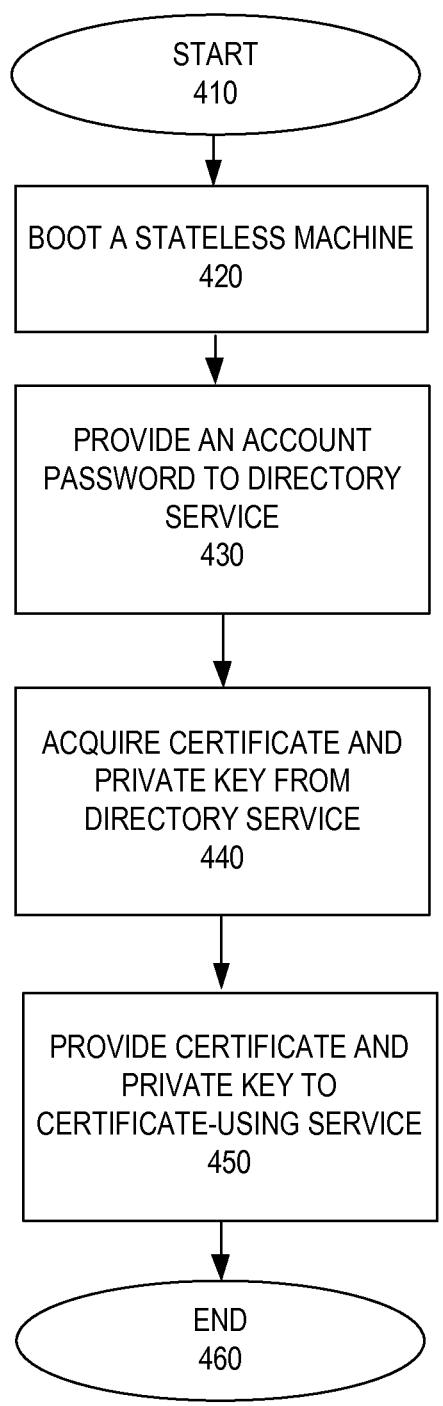
FIG. 4 is a flowchart representing an exemplary method of providing a private key, consistent with embodiments of the present disclosure.

FIG. 4 is a flowchart representing an exemplary method 400 for storing and retrieving a private key, consistent with embodiments of the present disclosure. Referring to FIG. 4, it will readily be appreciated that the illustrated procedure can be altered to delete steps or further include additional steps, as described below. Moreover, steps can be performed in a different order than shown in method 400, and/or in parallel. While the flowchart representing method 400 provides exemplary steps for a device (e.g., a device receiving session information, a device sending a private key, etc.) to provide and store keys associated with a stateless device, it is appreciated that one or more other devices can perform substantially similar steps alone or in combination with a client device or backend server.

After initial start step 410, a stateless machine is booted at step 420 (e.g., a virtual machine or physical, non-virtual machine). After a stateless machine boots, an account password can be provided to a directory service, as in step 430. As described above, credential roaming and/or autoenrollment can be configured to execute on a virtual machine. In embodiments described herein, a virtual machine can be configured to cause credential roaming to execute before autoenrollment. In some embodiments, a credential roaming mechanism can determine whether the virtual machine can retrieve a certificate and private key identifying the virtual machine from a directory service. The method can continue to step 440, where a certificate and private key are acquired from a directory service (e.g., using credential roaming). A virtual machine (or a device within the virtual machine) can determine whether the virtual machine is meant to provide a password (or password hash) associated with an account to the directory service. As described herein, in various embodiments a password associated with an account can be stored in persistent memory (e.g., memory 212 or password store 380). The method then continues to step 450, where the certificate and/or private key are provided to a certificate-using service. Method 400 can then end at step 460.

Figure 5:
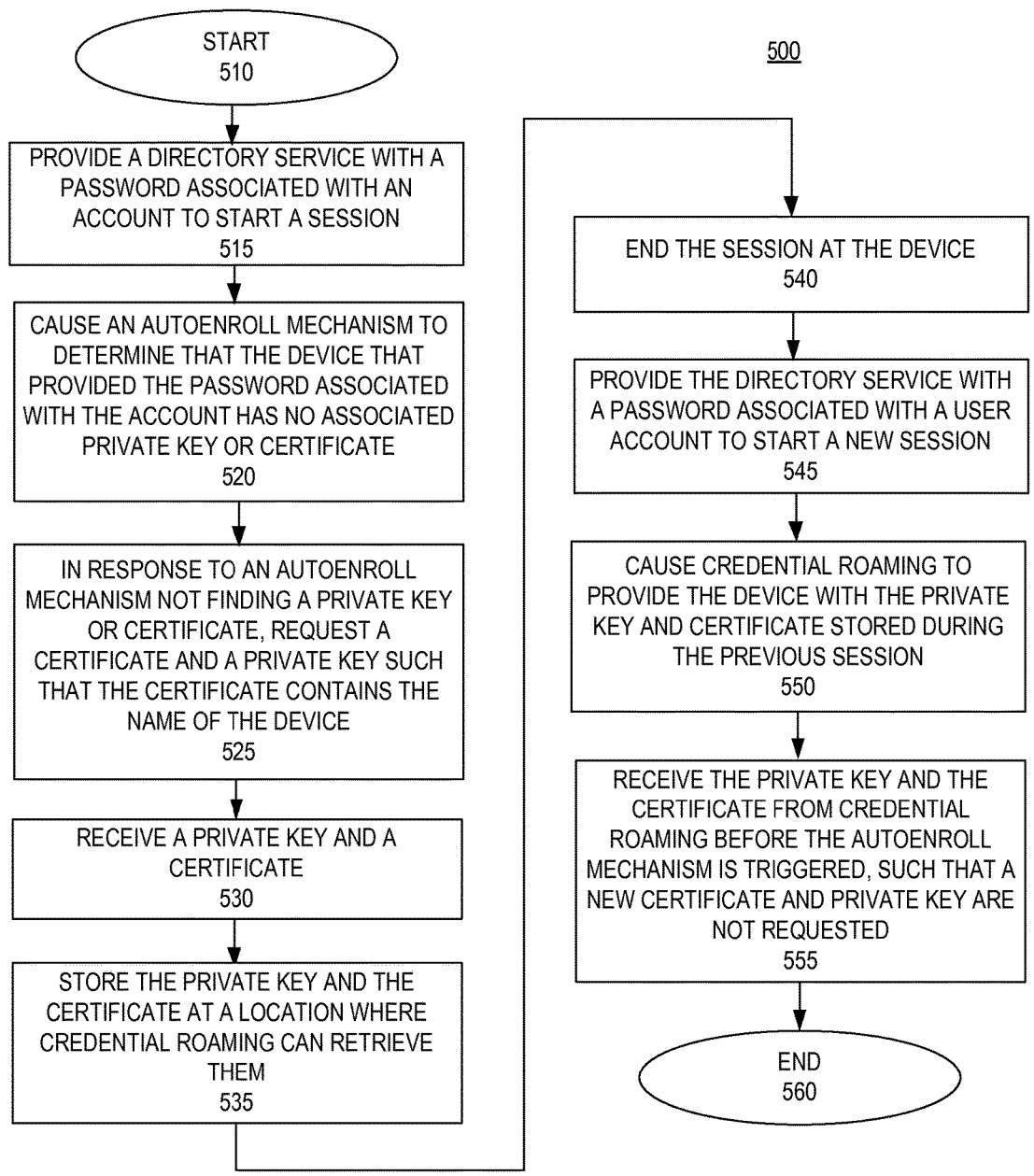
FIG. 5 is a flowchart representing an exemplary method of storing and retrieving a private key, consistent with embodiments of the present disclosure.

FIG. 5 is a flowchart representing an exemplary method 500 for storing and retrieving a private key, consistent with embodiments of the present disclosure. Referring to FIG. 5, it will readily be appreciated that the illustrated procedure can be altered to delete steps or further include additional steps, as described below. For instance, additional steps can occur in method 500. Moreover, steps can be performed in a different order than shown in method 500, and/or in parallel. While the flowchart representing method 500 provides exemplary steps for a device to provide and store keys associated with a stateless device, it is appreciated that one or more other devices can perform substantially similar steps alone or in combination with other devices.

After initial start step 510, step 515 a session is started (e.g., established) after a device (e.g., a stateless device) boots and provides credentials such as a password and/or identifier associated with an account (e.g., a managed service account) to a directory service. An account can be used such that the certificate that the account will later receive will include the name of the stateless device that provided the password, and not the name of a user (which would happen if a session was started with a user account). At step 520, an autoenrollment mechanism is activated and determines whether the device has an associated private key or certificate. If an autoenrollment mechanism determines that the device does not have an associated private key or certificate, which it shouldn't since the device has provided an account, then a request is made to a certificate authority for a private key and a certificate. This request should include the name of the device, such that the certificate will store the name of the device to use in future sessions with various certificate-using services such as Microsoft™ Internet Information Services.

The flowchart then continues to step 530, where the device receives a private key and a certificate. At step 535, the private key and the certificate are stored at a location where credential roaming can eventually retrieve them, since the private key and certificate cannot be stored on the stateless device as its memory is not persistent. This location can be a directory service such as Active Directory.

The flowchart continues to step 540, where the session at the stateless device ends (e.g., the stateless device was rebooted). Before the session ends, the certificate and private key are stored, as described above. At step 545, the device starts a session using a user account and provides a password associated with the user account to the directory service. User accounts, unlike system accounts, are able to employ credential roaming. Thus, at step 550, since the device logged on using a user account, credential roaming can provide the device with the private key stored during the previous session (where the session started by logging in with an account). Of course, this can occur for a third, fourth or fifth session (e.g., the stored key does not need to be from the previous session). The method then moves on to step 555, where the private key is received from credential roaming before an autoenrollment mechanism executes, such that a new private key and certificate are not requested (e.g., by the device or the autoenrollment mechanism). Here, since a session has a private key and a certificate, the autoenrollment mechanism determines that it does not need to request a new private key and certificate because the stateless device already has a private key and a certificate, in the same manner a non-stateless device would. The method can then end at step 560.

Figure 6A:
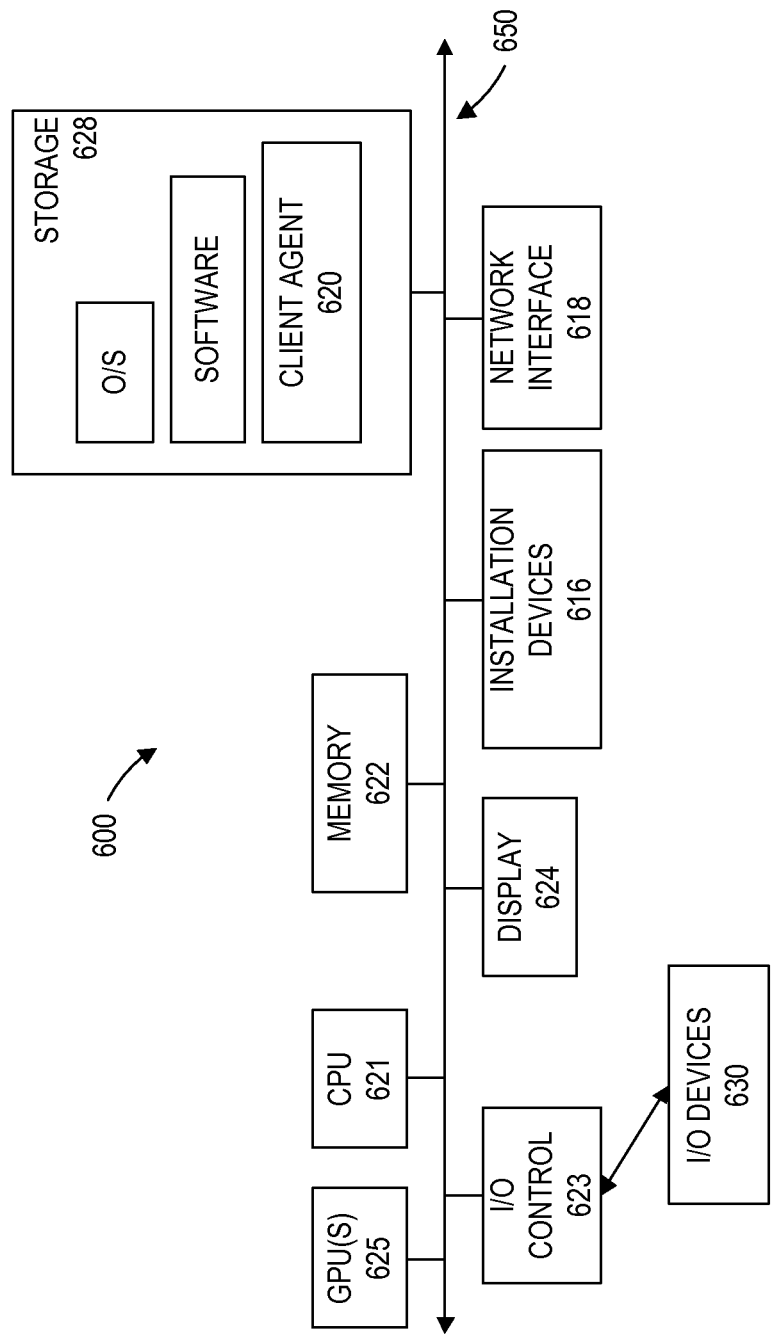
FIGS. 6A-6B are block diagrams of exemplary computing devices, consistent with embodiments of the present disclosure.
Figure 6B:
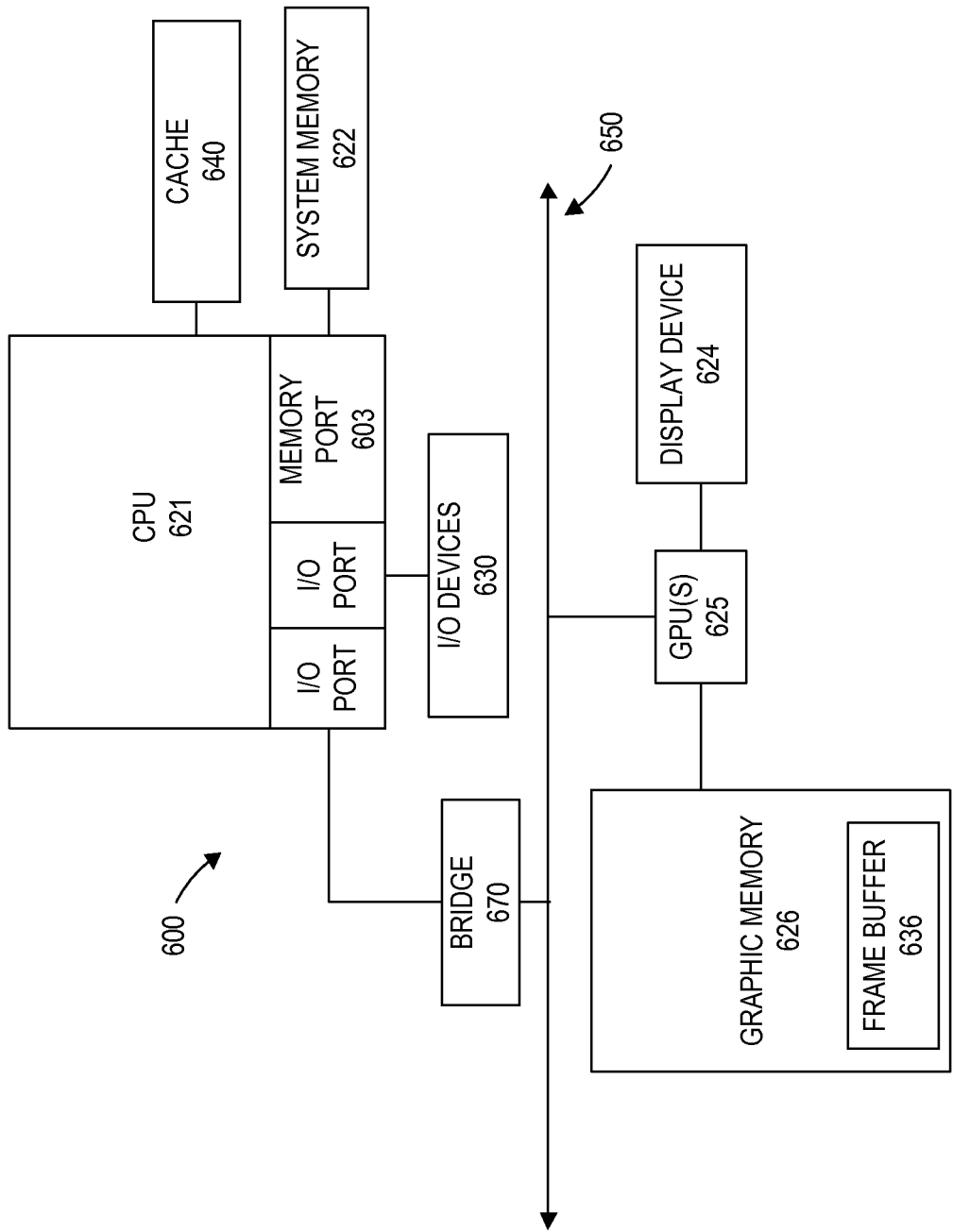

FIGS. 6A-6B are block diagrams of a computing device 600 providing a virtualization environment (e.g., virtualization environment 200 of FIG. 2), consistent with embodiments of the present disclosure. As shown in FIG. 6A, each computing device 600 can include one or more central processing units (CPUs) 621, one or more graphics processing units (GPUs 625), a system memory 622, and a graphic memory 626. CPUs 621 can be any logic circuitry that responds to and processes instructions fetched from the system memory 622. CPUs 621 can be a single or multiple microprocessors, field-programmable gate arrays (FPGAs), or digital signal processors (DSPs) capable of executing particular sets of instructions stored in a memory (e.g., system memory 622) or a cache (e.g., cache 640). CPUs 621 can also contain a plurality of processor registers for storing variable types of data. For example, these registers can store data, instructions, floating point values, conditional values, and/or addresses for locations in system memory 622. CPU registers can include special purpose registers used to store data associated with the running process such as an instruction pointer, instruction counter, and/or a memory stack pointer.

System memory 622 can be memory 212 of FIG. 2 and can include a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, processor cache, memory register, or a semiconductor memory. System memory 622 can be one or more memory chips capable of storing data and allowing any storage location to be directly accessed by CPUs 621. System memory 622 can be any type of random access memory (RAM), or any other available memory chip capable of operating as described herein. In the exemplary embodiment shown in FIG. 6A, CPUs 621 can communicate with system memory 622 via a system interface 650.

GPUs 625 can be any type of specialized circuitry that can manipulate and alter memory (e.g., graphic memory 626 or graphic memory 214 of FIG. 2) to provide and/or accelerate the creation of images stored in a frame buffer (e.g., frame buffer 616 shown in FIG. 6B or frame buffer 216 of FIG. 2) for output to a display device (e.g., display device 624). GPUs 625 can have a highly parallel structure making them more effective than CPUs 621 for algorithms where processing of large blocks of graphical data can be performed in parallel. Furthermore, the functionality of GPUs 625 can also be included in a chipset of in some other type of special purpose processing unit or co-processor.

CPUs 621 can connect to system memory 622 and system interface 650. CPUs 621 can execute programming instructions stored in the system memory 622, operate on data stored in system memory 622, and communicate with the GPUs 625 through the system interface 650, which bridges communication between the CPUs 621 and GPUs 625. In some embodiments, CPUs 621, GPUs 625, system interface 650, or any combination thereof, can be integrated into a single processing unit. GPUs 625 can be capable of executing particular sets of instructions stored in system memory 622 to manipulate graphical data store in system memory 622 or graphic memory 626. For example, GPUs 625 can receive instructions transmitted by the CPUs 621 and processes the instructions to render graphics data stored in the graphic memory 626. Graphic memory 626 can be any memory space accessible by GPUs 625, including local memory, system memory, on-chip memories, and hard disk. GPUs 625 can enable displaying of graphical data stored in graphic memory 626 on display device 624.

Computing device 600 can also include display device 624 and an input/output (I/O) device 630 (e.g., a keyboard, mouse, or pointing device) connected through an I/O controller 623, both of which communicate via system interface 650. It is appreciated that CPUs 621 can also communicate with system memory 622 and other devices in manners other than through system interface 650, such as through serial communication manners or point-to-point communication manners. Similarly, GPUs 625 can also communicate with graphic memory 626 and other devices in manners other than system interface 650. Furthermore, I/O device 630 can also provide storage and/or an installation medium for the client device 102.

FIG. 6B depicts various embodiments of computing device 600 in which CPUs 621 communicates directly with system memory 622 via a memory port 603, and similarly GPUs 625 communicates directly with graphic memory 626. CPUs 621 can communicate with a cache 640 via a secondary bus, sometimes referred to as a backside bus. In some embodiments, CPUs 621 can communicate with cache 640 via system interface 650. Cache 640 typically has a faster response time than system memory 622. In some embodiments, such as the embodiment shown in FIG. 6B, CPUs 621 can communicate directly with I/O device 630 via an I/O port. In further embodiments, I/O device 630 can be a bridge 670 between system interface 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Thunderbolt™ bus, or a Serial Attached small computer system interface bus.

As shown in FIG. 6B, GPUs 625 can also communicate directly with graphic memory 626 and display device 624. GPUs 625 can communicate with CPUs 621 and other devices through system interface 650. Graphic memory 626 can also include a frame buffer 636 (e.g., frame buffer 216). Frame buffer 636 can be a graphic output device that drives a display device (e.g., display device 624) from a memory buffer of graphic memory 626 containing a complete frame of graphical data. Frame buffer 316 can store the final graphic frames, which are to be displayed on display device 624.

As shown in FIG. 6A, computing device 600 can support any suitable installation device 616, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 620, or portion thereof. Client device 102 can further comprise a storage device 628, such as one or more hard disk drives or redundant arrays of independent disks, for storing an operating system and other related software, and for storing application software programs such as any program related to client agent 620. Optionally, any of the installation devices 616 could also be used as storage device 628.

Furthermore, computing device 600 can include a network interface 618 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 618 can comprise a built-in network adapter, network interface card, PCMCIA network card, card bus network adapter, wireless network adapter, USB network adapter, modem or any other device suitable for interfacing client device 102 to any type of network capable of communication and performing the operations described herein.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A device having one or more processors, the device comprising:
   a memory configured to store account credentials; and
   a stateless machine comprising one or more certificate-using services and a certificate distributor that is configured to:
      provide a directory service with the account credentials associated with the one or more certificate-using services for establishing a first session;
      acquire a certificate and a private key using the account credentials and information associated with the stateless machine;
      store the private key in the directory service before the first session ends;
      provide the directory service with user-account credentials for establishing a second session, wherein the user-account credentials are associated with a device hosting the stateless machine; and
      acquire the private key, using credential roaming, after the second session begins.

2. The device of claim 1, wherein the account credentials are provided to log on to a domain that includes the directory service.

3. The device of claim 1, wherein the user-account credentials are provided to log on to a domain that includes the directory service.

4. The device of claim 1, wherein the private key is stored in the directory service using a credential roaming mechanism, and wherein the private key is acquired after the second session begins using the credential roaming mechanism.

5. The device of claim 1, wherein the certificate distributor is included in the stateless machine.

6. The device of claim 1, wherein the memory configured to store account credentials is persistent.

7. The device of claim 1, wherein the certificate distributor is further configured to receive the private key before an autoenrollment mechanism is executed on the certificate distributor.

8. A method for recovering a private key, the method being performed by one or more processors associated with a stateless machine and comprising:
   providing a directory service with account credentials associated with one or more certificate-using services of the stateless machine for establishing a first session;

acquiring a certificate and a private key using the account credentials and information associated with the stateless machine;

storing the private key in the directory service before the first session ends;

providing the directory service with user-account credentials for establishing a second session, wherein the user-account credentials are associated with a device hosting the stateless machine; and acquiring the private key, using credential roaming, after the second session begins.

9. The method of claim 8, wherein the account credentials are provided to log on to a domain that includes the directory service.

10. The method of claim 8, wherein the user-account credentials are provided to log on to a domain that includes the directory service.

11. The method of claim 8, wherein the private key is stored in the directory service using a credential roaming mechanism, and wherein the private key is acquired after the second session begins using the credential roaming mechanism.

12. The method of claim 8, wherein providing the directory service with account credentials is performed by a certificate distributor included in the stateless machine.

13. The method of claim 8, wherein memory is configured to store account credentials and is persistent.

14. The method of claim 8, wherein a certificate distributor is configured to receive the private key before an autoenrollment mechanism is executed on the certificate distributor.

15. A nontransitory computer readable storage medium storing a set of instructions that are executable by at least one processor associated with a stateless machine, to cause the stateless machine to perform a method for recovering a private key, the method comprising:

providing a directory service with account credentials associated with the one or more certificate-using services of the stateless machine for establishing a first session;

acquiring a certificate and a private key using the account credentials and information associated with the stateless machine;

storing the private key in the directory service before the first session ends;

providing the directory service with user-account credentials for establishing a second session, wherein the user-account credentials are associated with a device hosting the stateless machine; and acquiring the private key, using credential roaming, after the second session begins.

16. The nontransitory computer readable storage medium of claim 15, wherein the account credentials are provided to log on to a domain that includes the directory service.

17. The nontransitory computer readable storage medium of claim 15, wherein the user-account credentials are provided to log on to a domain that includes the directory service.

18. The nontransitory computer readable storage medium of claim 15, wherein the private key is stored in the directory service using a credential roaming mechanism, and wherein the private key is acquired after the second session begins using the credential roaming mechanism.

19. The nontransitory computer readable storage medium of claim 15, wherein memory configured to store account credentials is persistent.

20. The nontransitory computer readable storage medium of claim 15, wherein a certificate distributor of the stateless machine is configured to receive the private key before an autoenrollment mechanism is executed on the certificate distributor.

* * * * *